United States Patent [19]

Gruber et al.

[11] Patent Number: 4,609,690
[45] Date of Patent: Sep. 2, 1986

[54] AQUEOUS HYDROXYL-ACRYLIC LATEX AND WATER DISPERSIBLE MULTI-ISOCYANATE ADHESIVE COMPOSITION

[75] Inventors: Norma J. Gruber, Worthington; Clois E. Powell, Westerville, both of Ohio

[73] Assignee: Ashland Oil, Inc., Ashland, Ky.

[21] Appl. No.: 687,472

[22] Filed: Dec. 28, 1984

Related U.S. Application Data

[63] Continuation-in-part of Ser. No. 537,294, Sep. 29, 1983, Pat. No. 4,491,646.

[51] Int. Cl.[4] .......................... C08L 33/14; C09J 3/14; C08K 3/20; C08J 5/12
[52] U.S. Cl. .................................... 523/334; 524/507; 524/558; 525/123; 428/425.1
[58] Field of Search ................. 524/558, 507; 525/123; 528/425.1; 523/334

[56] References Cited

U.S. PATENT DOCUMENTS

| | | | |
|---|---|---|---|
| 3,549,404 | 12/1970 | Liberti | 524/507 |
| 3,931,088 | 1/1976 | Sakurada | 524/501 |
| 4,396,738 | 8/1983 | Powell | 524/507 |
| 4,433,095 | 2/1984 | Hombach | 524/565 |
| 4,476,276 | 10/1984 | Gasper | 524/507 |
| 4,491,646 | 1/1985 | Gruber | 524/558 |

FOREIGN PATENT DOCUMENTS

| | | | |
|---|---|---|---|
| 0023618 | 2/1982 | Japan | 524/507 |
| 0104948 | 6/1983 | Japan | 524/507 |

*Primary Examiner*—C. Warren Ivy
*Attorney, Agent, or Firm*—Mueller and Smith

[57] ABSTRACT

Disclosed is an improved aqueous latex adhesive composition of the type having an aqueous latex in admixture with a water dispersible multi-isocyanate cross-linking agent and a thickener. The improvement for a room temperature curable adhesive composition having improved water resistance comprises the curable ingredients consisting essentially of an aqueous hydroxyl functional latex which contains hydroxyl groups as its only isocyanate reactive functionality and the multi-isocyanate cross-linking agent. The cross-linking agent is a water dispersible or water dispersed multi-isocyanate and preferably is a multi-isocyanate which has undergone partial reaction of some of its isocyanate groups with a hydrophobic monohydroxy alcohol. Desirably, fillers incorporated into the adhesive composition are formed into a filler grind prior to incorporation into the adhesive composition. The adhesive composition is especially useful as a structural adhesive in structural lamination manufacture.

24 Claims, No Drawings

4,609,690

AQUEOUS HYDROXYL-ACRYLIC LATEX AND WATER DISPERSIBLE MULTI-ISOCYANATE ADHESIVE COMPOSITION

CROSS-REFERENCE TO RELATED APPLICATIONS

This application is a continuation-in-part of copending application Ser. No. 537,294, filed Sept. 29, 1983, now U.S. Pat. No. 4,491,646.

BACKGROUND OF THE INVENTION

The present invention relates to aqueous adhesive compositions curable at room temperature and more particularly to an improved aqueous latex adhesive composition possessing improved water resistance and being especially adapted for use in structural lamination manufacture.

Various forms of plywood have found utility as structural or load-bearing components in the construction industry. While urea resins, melamine-urea cocondensation resins and phenol resins initially predominated as the adhesives of choice in plywood manufacture, aqueous-based adhesives have more recently found general acceptance in plywood manufacture. Aqueous adhesives can reduce the amount of organic volatiles released from the adhesive composition upon drying and generally possess less organic volatile material which can be released by the adhesive during use of the laminates over time. The reduction of water-sensitivity of the aqueous adhesives, however, was an initial concern of laminate manufacturers. This problem has been addressed by the art and several solutions proposed.

One solution germane for present purposes is the protected-isocyanate approach disclosed in U.S. Pat. No. 3,931,088. The water-resistant adhesive reported therein consists of an aqueous SBR or similar latex and an isocyanate dispersed in a hydrophobic solution of organic solvent. The latex, the surfactant associated with the latex, or an added ingredient bears active-hydrogen groups for linking with the isocyanate at room or elevated temperature. Another solution for present purposes is the emulsified isocyanate approach disclosed in U.S. Pat. No. 4,396,738. The water-resistant adhesive reported therein consists of an aqueous latex emulsion or dispersion of a vinyl polymer and a polyisocyanate which has had some of its isocyanate groups reacted with a monohydroxy alcohol.

U.S. Pat. No. 3,996,154 and related British Pat. No. 1,444,933 disclose oil-in-water emulsions which are useful as adhesives. The emulsion comprises water, an aromatic polyisocyanate, and a non-ionic surface active agent which may be an alkyl ether of polyethylene glycol reacted with a polyisocyanate. Alternatively, the surface active agent may be the reaction product of a polyisocyanate and an ethoxylated alkanol such as shown in British Pat. No. 1,417,618. British Pat. No. 1,129,408 proposes to bond glass to rubber with an adhesive composition which is an aqueous dispersion or emulsion of a polyisocyanate which has been emulsified or dispersed with the aid of an emulsifying agent, a rubber latex, and optionally a polyepoxide compound. Emulsifying agents include non-ionic and anionic compounds, such as polyethylene oxide or polyvinyl ether. British Pat. No. 1,601,033 proposes a laminating adhesive which is an aqueous dispersion of a polyurethane latex and a hydrophobic polyisocyanate which is an aliphatic or cycloaliphatic polyisocyanate. Finally, U.S. Pat. No. 4,433,095 proposes an aqueous adhesive which is comprised of an aqueous polymer dispersion and a water-dispersible polyisocyanate which is made up of an aromatic polyisocyanate and an emulsifier produced by reacting aromatic polyisocyanates with hydrophilic compounds. Suitable hydrophilic compounds are shown to be monohydric or polyhydric, non-ionic polyalkylene polyether alcohols.

BROAD STATEMENT OF THE INVENTION

Applicant's co-pending application Ser. No. 537,294, cited above, is directed to a latex adhesive composition having improved water resistance and which is characterized by a mixture of an aqueous latex phase and a multi-isocyanate phase. The aqueous latex phase was restricted to curable ingredients consisting essentially of an aqueous hydroxyl-functional latex which contains hydroxyl groups as its only isocyanate-reactive functionality. The multi-isocyanate phase is an organic solvent solution of the multi-isocyanate cross-linking agent. Such solvent solution of the multi-isocyanate cross-linking agent is based upon the protected-isocyanate approach disclosed in U.S. Pat. No. 3,931,088.

The present invention is latex adhesive composition equivalent to the latex adhesive composition disclosed in applicant's co-pending application, except that the multi-isocyanate phase is a water dispersed or water dispersible multi-isocyanate cross-linking agent, such as based on U.S. Pat. No. 4,396,738. Broadly, however, any form of water-dispersible or water-dispersed multi-isocyanate which is sufficiently protected from water so that the composition is reasonably storge stable is suitable for use in the latex adhesive composition of the present invention.

The improved water resistance characteristics expressed by the latex adhesive composition is due in part to the functionality restriction placed on the aqueous latex phase. No other source of functionality reactive with the cross-linking agent is contained in the aqueous latex phase including, for example, surfactants, protective colloids, thickeners, fillers, and other ingredients normally associated with the latex phase of an adhesive composition. Also, the latex desirably is synthesized only from acrylic monomers for high performance applications.

Another aspect of the present invention is a method for compounding the improved aqueous latex adhesive composition of the present invention. Such process comprises mixing an aqueous latex phase with a water dispersible or water dispersed multi-isocyanate phase, and optionally a thickener. The aqueous latex phase is restricted to curable ingredients consisting of an aqueous hydroxyl-functional latex which contains hydroxyl groups as its only isocyanate-reactive functionality. The multi-isocyanate phase is dispersible in the aqueous latex phase to form a storage stable composition. The thickener contains no functionality reactive with an isocyanate group. An especially preferred embodiment of such method involves the formation of a grind of inert fillers for inclusion in the adhesive composition. Desirably, also, the particle size of the latex and the particle size of the pigment grind are adjusted to be about the same size.

Advantages of the present invention include a latex adhesive composition ideally suited for manufacturing structural laminates, eg. plywood. A further advantage is a structural adhesive composition which is extremely resistant to water. A further advantage is a latex adhesive composition which possesses unusually long pot life and is resistant to foam formation. A yet further advantage is the ability to readily adjust viscosity of the adhesive composition without harming performance characteristics of the composition. These and other advantages will be readily apparent to those skilled in the art based upon the disclosure contained herein.

DETAILED DESCRIPTION OF THE INVENTION

The present invention is based upon several unexpected discoveries which were uncovered during the course of research aimed at improving aqueous latex adhesives, for example, of the types discussed above. The unexpected discoveries upon which the present invention is based include the elimination of active-hydrogen functionality from all components in the adhesive composition except for the aqueous latex itself. Another discovery is that the active-hydrogen functionality should not be carboxyl or the like, but should be restricted to hydroxyl only. The elimination of carboxyl group unexpectedly resulted in improved foam suppression and the hydroxyl group placement on the latex restriction resulted in improved water resistance. This combination of restrictions placed on the adhesive composition is not recognized in the art.

Referring initially to the aqueous latex, such aqueous latex bears hydroxyl functionality as its only isocyanate-reactive functionality in accordance with the precepts of the present invention. Desirably, the ingredients used to synthesize the latex are restricted to acrylic monomers for high performance applications, though non-acrylic monomers (e.g. other vinyl monomers, polyesters, etc.) may find use on occasion. Suitable acrylic monomers include, for example, alkyl esters of acrylic and methacrylic acid, for example, lower alkyl esters of acrylic or methacrylic acid such as methyl acrylate or methyl methacrylate, the propyl acrylate or propyl methacrylates, the butyl acrylates or butyl methacrylates, 2-methylhexyl acrylate, n-octyl acrylate, 2-ethylhexyl acrylate, octyl methacrylate, and similar alkyl acrylates or methacrylates. Hydroxyl-containing acrylic monomers include hydroxyl derivatives of those monomers named above, or pentaerythritol triacrylate, trimethylol propane triacrylate, or the like can be used in providing hydroxyl groups to the latex in conventional fashion. Synthesis of such latices is so common that little more need be said about it here to those skilled in this art. It is important only, however, that the latex contain only hydroxyl functionality as discussed above.

The latex phase should range in particle size from about 3,000 to 9,000 A with typical latex particles ranging around 5,000 A. Such larger latice particle sizes are achievable using the preferred acrylic monomers as noted above. Such particle sizes are larger than the particle sizes typically achieved by SBR latices in the art. Additionally, the latex phase should have a glass transition temperature (hereinafter Tg) ranging from about $-3°$ to $20°$ C. Additionally, the hydroxyl content of the latex should range from between about 1% and 6% hydroxyl monomer content by weight.

The multi-isocyanate cross-linking agent is a conventional multi-isocyanate used in urethane reaction. Multi-isocyanates preferably will have from about 2-4 isocyanate groups for use in the coating composition of the present invention. Suitable multi-isocyanates for use in the present invention include, for example, hexamethylene diisocyanate, toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), dimer acid diisocyanate (DDI), trimethyl hexamethylene diisocyanate, lysine diisocyanate and is methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic poly-isocyanate dimers, trimers, oligomers, polymers (including biuret and isocyanurate derivatives), and isocyanate functional prepolymers often are available as preformed packages and such packages are suitable for use in the present invention also.

Preferably, the adhesive formulation utilizes a multi-isocyanate which has undergone at least partial reaction between some of its isocyanate groups and a monohydroxy alcohol. The monohydroxy alcohol advantageously is an alkanol containing at least one and preferably between about 6 and 30 carbon atoms (e.g. hydrophobic alkanol). Representative monohydroxy alcohols include, for example, n-hexyl alcohol, n-heptyl alcohol, n-octyl alcohol, n-nonyl alcohol, n-decyl alcohol, lauryl alcohol, myristyl alcohol, cetyl alcohol, stearyl alcohol, arachidyl alcohol, behenyl alcohol, isohexyl alcohol, 2-ethyl hexanol, 2-ethyl isohexanol, isooctyl alcohol, isononyl alcohol, isodecyl alcohol, isotridecyl alcohol, isocetyl alcohol, isostearyl alcohol, oleyl alcohol, linolyl alcohol and the like. The modified isocyanate may be used as is or dispersed in water.

Alternatively, the water-dispersible multi-isocyanate may be any of those modified multi-isocyanates disclosed in the Background above. For example, the hydrophilic compound modified aromatic polyisocyanates of U.S. Pat. No. 4,433,095 may find utility in forming the aqueous latex adhesives of the present invention. It must be recognized, however, that the preferred hydrophobic modified isocyanates generally will provide improved adhesive performance compared to the hydophilic compound modified isocyanates. Regardless of whether the multi-isocyanate phase is rendered water-dispersible by modification with the hydrophobic compound, a hydrophilic compound, or combinations thereof, the modified multi-isocyanates may be used as is for addition to the aqueous latex phase or may be dispersed in water prior to addition to the aqueous latex phase.

The hydroxyl-functional latex and cross-linking agent are the only reactive ingredients in the improved aqueous latex adhesive composition of the present invention. Additional non-functional ingredients find utility in the latex, it must be recognized. Thickeners are quite useful in formulating the adhesive for providing advantageous viscosity adjustment for particular application techniques. Such thickeners or thixotropic agents, however, must not contain groups reactive with the isocyanate cross-linking agent. Representative non-functional thickeners include, for example, poly(alkyl vinyl ethers), poly(N-vinyl pyrrolidone) and its alkylated derivatives, poly(methyl vinyl ether/maleic anhydride) and its nonionic esters, acrylic acid/acrylamide copolymers, and the like and mixtures thereof.

Additional ingredients which find use in the adhesive composition are fillers which may be organic or inorganic. Organic fillers include, for example, wood powder, walnut shell powder or the like. Inorganic fillers include, for example, clays such as kaolinite clays, silica, talc, titanium dioxide, zinc oxide, and the like. Advantageously, the inert filler ingredients or fillers are formed into a filler grind and the grind incorporated into the adhesive composition. The grind is formed in conventional fashion as pigment grinds for paints are formed by the use of various attrition mills. Broadly, the filler grind particle size ranges from about 300 Å to 30,000 Å. Desirably, the filler grind particle size is within the range of particle size for the latex and preferably the particle size is about the same as the latex particle size for forming a monodisperse adhesive composition. The proportion of filler or filler grind utilized can range on up to about 100 wt-% based upon the latex phase. Generally, the fillers will range from between about 20% to about 60% solids by weight of the latex phase.

The improved aqueous latex adhesive composition of the present invention possesses a pot life which can range up to 8 hours (or one shift) which is extremely convenient for factory use of the composition. The latex composition also is relatively free of foam which also improves mechanical handling of the composition. The adhesive composition is formulated by blending, ofter under high shear conditions, of the aqueous latex phase, the isocyanate phase, and the filler ingredients which preferably are provided as a filler grind. The thickener and filler are adjusted to provide a viscosity ranging from about 1,000 to 5,000 centipoises at ambient indoor room temperature. The adhesive composition may be applied by conventional roller coating, both direct and indirect, spray application, dip application, or any application technique that is necessary, desirable, or convenient. Plys of wood can be laminated in conventional fashion under pressures typically used in wood laminate or plywood production. The pressed laminates may be held at ambient indoor temperature for curing of the adhesive or may be heated if an adequate source of heat is available or for special effects. Additionally, the adhesive may be cured by exposure to radio frequency or electromagnetic waves and by microwave radiation. Regardless of the manner of cure, structural laminates of improved strength and water resistance result by using the adhesive composition of the present invention. The improved water resistance is especially noted by Boil/Dry test evaluation of the adhesive as described in detail in the Examples which follow. For structural lamination, the water resistance of the adhesive is an especially valued feature. The performance capabilities of the adhesive are especially accentuated when the adhesive is used to cold set finger joints. Remarkable improvement in performance is experienced in finger joint applications as the Examples will demonstrate. Moreover, RF curing of finger joins can be readily practiced in commercial scale operations.

The following Examples show how the present invention has been practiced but should not be construed as limiting. In this application, all proportions and percentages are by weight unless otherwise expressly indicated. Also, all citations referenced herein are expressly incorporated herein by reference.

EXAMPLES

EXAMPLE 1

The following adhesives were formulated for evaluation.

TABLE 1

| Adhesive No. 121A (Comparative) | |
|---|---|
| Aqueous Phase | Parts by Weight (PBW) |
| Latex | |
| (1) Hhydroxyl acrylic latex | 58.15 |
| Filler Grind | |
| (2) Nalco 9SS-068 Thickener | 0.55 |
| (3) CaCO$_3$ | 23.92 |
| (4) Sodium dioctyl sulfosuccinate | 0.24 |
| Demineralized water | 12.65 |
| Additives | |
| (5) Dowicil 75 fungicide | 0.87 |
| (6) Nopco 8034 defoamer | 0.30 |
| (7) Tamol 731 dispersant | 1.91 |
| Toluene | 1.41 |
| Cross-Linker Phase | |
| (8) Mondur MR diisocyanate | 75.0 |
| Dibutyl phthlate | 12.5 |

TABLE 1-continued

| Adhesive No. 121A (Comparative) | |
|---|---|
| Aqueous Phase | Parts by Weight (PBW) |
| Toluene | 12.5 |

(1) Butyl acrylate, methyl methacrylate, 2-hydroxy ethyl acrylate (Tg 12° C., 3% HEA) supplied at 50% non-volatile solids.
(2) Nalco 9SS-068 liquid polymeric thickener specific gravity 1,072, density 8.93 ± 0.10 lbs/gal, flash point 130° F., 33.4 ± 1 wt-% solids, viscosity 740 ± 30 cps (Brookfield, #3 spindle, 60 rpm, 72° F.), Nalco Chemical Company Oak Brook, Illinois.
(3) Gamma-Sperse 80 brand $CaCO_3$, Georgia Marble Company, Atlanta, Georgia.
(4) Aerosol OT brand of sodium dioctyl sulfosuccinate, 75% solids in water/alcohol, 1.09 g/cm, 200 cps, pH 5-7, acid number 2.5 max., IV .25 max., American Cyanamid Company, Wayne, New Jersey.
(5) Dowicil 75 anti-microbial agent is 1-(3-chloroallyl)-3,5,7-triaza-1-azonia-adamantane chloride (67.5% active by weight, balance is 32.5% inerts and 23% sodium bicarbonate); supplied here in additional demineralized water (0.14 pbw Dowicil 75 in 0.73 pbw water), Dow Chemical U.S.A., Midland, Michigan.
(6) Nopco 8034 defoamer is reported only as an opaque, off-white liquid, 0° F. pour point 7.5 lb/gal defoamer (Diamond Shamrock Corporation, Morristown, New Jersey).
(7) Tamol 731 brand of sodium salt of a carboxylate polyelectrolyte pigment dispersant, pH 10.0, 25% solids by weight, density (25° C.) 9.2#/gal, Rohm and Haas, Philadelphia, Pennsylvania.
(8) Mondur MR isocyanate is a polymeric diphenylmethane diisocyanate, equivalent weight of 133, Mobay Chemical Corporation, Pittsburgh, Pennsylvania.

The adhesive was formulated by preparing the filler grind using a Cowles mill containing all filler ingredients except the $CaCO_3$ which was added under very high shear mixing conditions over a 5 minute interval. The filler grind was let down into the latex phase in the Cowles mill under low agitation conditions followed by the addition of the additives in the order listed above.

Adhesive No. 121B was the same as Adhesive No. 121A (comparative adhesive of U.S. Pat. No. 4,491,646), except that the cross-linker phase was the water-dispersible modified isocyanate of Example I(2)(b) of U.S. Pat. No. 4,396,738, viz. isocetyl alcohol modified Mondur MR. Adhesive No. 121C was the same as Adhesive No. 121A, except that the cross-linker phase was water-dispersed (65% by weight) modified isocyanate of Example I(2)(c) of U.S. Pat. No. 4,396,738, viz. emulsifier (2 gm. hexadecanol, 2 gm octyl phenoxy ethanol containing 10 moles of condensed ethylene oxide and sold under the trade name of Triton X100 of Rohm & Haas Co., and 13 gm of a 70% aqueous solution of sodium bis-tridecyl sulfosuccinate), water, and isocetyl alcohol modified Mondur MR. Adhesive No. 121D as the same as adhesive No. 121A, except that the cross-linker phase was Desmodur KA-8267, which is believed to be a polyalkylene polyether alcohol modified diphenyl methane diisocyanate of U.S. Pat. No. 4,433,095 (Bayer Aktiengesellschaft).

Each of the adhesives were applied (spread rate of 0.033 $gm/cm^2$) on Douglas Fir veneer (0.3175 cm thick, sawed and planed) and pressed at 150 psi for 16 hours. Lap shear performance was evaluated after 5 days of aging on dry, ambient-cured samples (Normal) and on ambient-cured samples that were boiled in water for four hours, dried at 60° C. for 20 hours, boiled in water for another four hours, cooled to tap water temperature for one hour, and then tested wet (Boil Dry). Lap shear measurements were conducted on an Instron instrument with a crosshead speed of 0.254 cm/min. The following results were recorded.

TABLE 2

| Adhesive No. | Aqueous Phase (pbw) | Cross-Linker Phase (pbw) | Normal (psi) | Normal Wood Failure (%) | Boil/Dry (psi) | Boil/Dry Wood Failure (%) |
|---|---|---|---|---|---|---|
| 121A (Comparative) | 100 | 18.8 | 733.8 | 100.0 | 548.4 | 99.3 |
| 121B | 100 | 21.15 | 802.2 | 100.0 | 564.4 | 63.0 |
| 121C | 100 | 21.15 | 935.1 | 88.3 | 531.7 | 18.0 |
| 121D | 100 | 16.45 | 760.0 | 100.0 | 511.1 | 54.7 |

Both adhesive numbers 121B and 121C remained fluid after 24 hours at room temperature, while adhesives numbers 121A and 121D has solidified. It will be seen that the emulsified isocyanate technique was successful in providing stabel adhesives as well as excellent adhesive performance. The boil/dry tensile data clearly shows the efficacy of both of the solvent solution isocyanate technique as well as the aqueous emulsion technique. It will be appreciated, however, that the presence of a minor quantity of functional surfactant in adhesive No. 121C did reduce the boil/dry tensile strength results consistent with the disclosure herein. On occasion, however, such minor quantity of functional surfactants are required for stabily emulsifying the isocyanate in water. Regardless of the manner of stabily providing the isocyanate in the aqueous adhesive composition, the efficacy of the adhesive composition of the present invention is demonstrated.

EXAMPLE 2

In this example the effects of added hydroxyl functionality in the form of polyvinyl alcohol (PVA) was studied. Adhesive No. 141A was the same adhesive formulation as Adhesive No. 121B of Example 1. Adhesive No. 141B contained a latex phase consisting of 200 weight parts of the latex of Example 1 and 100 weight parts of a 10% by weight aqueous solution of polyvinyl alcohol (Vinol 523S brand, Air Products Co., Allentown, Pa.). Adhesive No. 141C was the same comparative adhesive formulation as Adhesive No. 121A of Example 1. The adhesives were applied (spread rate of 0.0205 $gm/cm^2$) on Douglas Fir veneer (as in Example 1) and pressed at 200 psi at 130° C. for 7 minutes. Each sample then was tested as described in Example 1.

TABLE 3

| Adhesive No. | Aqueous Phase (pbw) | Cross-Linker Phase (pbw) | Normal (psi) | Normal Wood Failure (%) | Boil/Dry (psi) | Boil/Dry Wood Failure (%) |
|---|---|---|---|---|---|---|
| 141A | 100 | 20.0 | 931.2 | 98.6 | 522.7 | 63.3 |
| 141B | 100 | 14.55 | 1024.5 | 100.0 | 126.7 | 0 |

TABLE 3-continued

| Adhesive No. | Aqueous Phase (pbw) | Cross-Linker Phase (pbw) | Normal (psi) | Normal Wood Failure (%) | Boil/Dry (psi) | Boil/Dry Wood Failure (%) |
| --- | --- | --- | --- | --- | --- | --- |
| 141C | 100 | 20.0 | 860.9 | 99.0 | 515.1 | 63.3 |

The above-tabulated results demonstrate the adverse consequences which the added source of hydroxyl functionality has on performance of the adhesive. The adhesive formulations of the present invention and of Applicant's U.S. Pat. No. 4,491,646, however, display excellent performance, especially Boil/Dry tensile strength. Again, the efficacy of the present invention is demonstrated.

We claim:

1. In an aqueous latex adhesive composition of an aqueous latex in admixture with a stabily dispersed or emulsified multi-isocyanate cross-linking agent, the improvement for an adhesive composition having improved water resistance which comprises the curable ingredients consisting essentially of an aqueous hydroxyl-functional latex which contains hydroxyl groups as its only isocyanate-reactive functionality and said multi-isocyanate cross-linking agent.

2. The adhesive composition of claim 1 wherein said latex is formed from only acrylic monomers.

3. The latex of claim 2 wherein said acrylic monomers contain between about 1% and 6% by weight of a hydroxyl-bearing acrylic monomer.

4. The adhesive composition of claim 1 wherein the glass transition temperature of said latex ranges from between about $-3°$ and $+20°$ C.

5. The adhesive composition of claim 1 wherein said latex particle size ranges from about 3,000 to 9,000 A.

6. The adhesive composition of claim 1 which has a visosity of between about 1,000 and 5,000 centipoises at ambient indoor room temperature.

7. The adhesive composition of claim 1 which contains inert filler ingredients.

8. The adhesive composition of claim 4 wherein said latex is a terpolymer of butyl acrylate, methyl methacrylate, and 2-hydroxy ethyl acrylate.

9. The adhesive composition of claim 7 wherein said inert filler ingredients are formed into a grind ranging in size from between about 300 and 30,000 A prior to incorporation into said adhesive composition.

10. The aqueous adhesive composition of claim 1 wherein said multi-isocyanate cross-linking agent is a multi-isocyanate which has undergone at least partial reaction of only some of its isocyanate groups with a monohydroxy alcohol.

11. The aqueous adhesive composition of claim 10 wherein said monohydroxy alcohol is a $C_6$-$C_{30}$ alkanol.

12. A method for making an aqueous latex adhesive composition of an aqueous latex in admixture with a water dispersible multi-isocyanate cross-linking agent, and inorganic filler ingredients, the improvement for a room temperature-curable adhesive composition having improved water resistance comprises:

forming a filler grind of said filler ingredients ranging in particle size from between about 300 and 30,000 A; and blending said grind with said latex, said cross-linking agent, and said filler ingredients the only active-hydrogen functionality in said adhesive composition comprising hydroxyl groups on said latex.

13. The method of claim 12 wherein the viscosity of said adhesive composition ranges from between about 1,000 and 5,000 centipoises at ambient indoor room temperature.

14. The method of claim 12 wherein said latex is synthesized from only acrylic monomers between about 1% and 6% by weight thereof bearing a hydroxyl group, the glass transition temperature of said latex ranging from between about $-3°$ and $+20°$ C.

15. The method of claim 14 wherein said latex comprises a terpolymer of butyl acrylate, methyl methacrylate, and 2-hydroxyethyl acrylate.

16. The method of claim 12 wherein said multi-isocyanate cross-linking agent is a multi-isocyanate which has undergone at least partial reaction of only some of its isocyanate groups with a monohydroxy alcohol.

17. The method of claim 16 wherein said monohydroxyl alcohol is a $C_6$-$C_{30}$ alkanol.

18. A composite of at least two wooden surfaces which are adhesively joined by the dried residue of an aqueous latex adhesive composition, the improvement in water-resistance of said adhesive composition comprises the curable ingredients of said adhesive composition consisting essentially of an aqueous hydroxyl-functional latex which contains hydroxyl groups as its only isocyanate-reactive functionality and a water dispersible multi-isocyanate cross-linking agent.

19. The composite of claim 18 wherein said latex is of acrylic monomers only wherein between 1% and 6% by weight of said acrylic monomers bears a hydroxyl group.

20. The composite of claim 19 wherein the glass transition temperature of said latex ranges from between about $-3°$ and $20°$ C.

21. The composite of claim 19 wherein said latex particle size ranges from between about 3,000 and 9,000 A.

22. The composite of claim 19 wherein said latex is a terpolymer of butyl acrylate, methyl methacrylate, and 2-hydroxy ethyl acrylate.

23. The composite of claim 18 wherein said adhesive composition also contains inert filler ingredients.

24. The composite of claim 18 wherein said adhesive composition is cured at room temperature, by exposure to radio frequency, or by exposure to microwaves.

* * * * *